(12) United States Patent
Helliwell

(10) Patent No.: US 6,751,667 B1
(45) Date of Patent: Jun. 15, 2004

(54) SYSTEM FOR GENERATING UNIQUE IDENTIFIERS IN A COMPUTER NETWORK

(75) Inventor: Richard P. Helliwell, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 745 days.

(21) Appl. No.: 09/680,678

(22) Filed: Oct. 6, 2000

(51) Int. Cl.$^7$ .................................................. G06F 1/02
(52) U.S. Cl. ........................................ 709/226; 708/250
(58) Field of Search ........................... 709/226; 708/250

(56) References Cited

U.S. PATENT DOCUMENTS

| | | | | |
|---|---|---|---|---|
| 4,819,818 A | * | 4/1989 | Simkus et al. ................. | 463/22 |
| 5,541,996 A | * | 7/1996 | Ridenour ....................... | 380/46 |
| 5,778,069 A | * | 7/1998 | Thomlinson et al. ......... | 380/262 |
| 6,243,738 B1 | * | 6/2001 | Hayles et al. ................ | 709/203 |
| 6,324,558 B1 | * | 11/2001 | Wilber ......................... | 708/255 |
| 6,490,637 B1 | * | 12/2002 | Shih .............................. | 710/8 |
| 6,532,497 B1 | * | 3/2003 | Cromer et al. ............... | 709/250 |
| 6,533,664 B1 | * | 3/2003 | Crumby ........................ | 463/42 |
| 6,628,786 B1 | * | 9/2003 | Dole ............................. | 380/44 |

* cited by examiner

Primary Examiner—David Y. Eng

(57) ABSTRACT

A system for generating unique identifiers (UUIDs) for software objects and other components in a network in which a large number of components may exist simultaneously and/or over a period of time. UUIDs generated by a particular product are divided into two sub-fields. One sub-field is stored in (relatively slow) non-volatile memory, and incremented infrequently. The other sub-field is stored in relatively fast, volatile RAM, that can be incremented quickly. During operation, the product creating the UUIDs generates new UUIDs by incrementing the field stored in RAM. When overflow of the RAM field occurs, the field stored in non-volatile memory is incremented. A block of flash memory is initialized to all ones, and the bits therein are then sequentially cleared to generate each subsequent unique identifier. The present system provides the equivalent of a counter that can count up to the number of available bits in non-volatile memory plus one, while reducing the number of flash memory erase cycles to one cycle for each time all the bits are cleared.

15 Claims, 5 Drawing Sheets

SYSTEM FOR GENERATING UNIQUE IDENTIFIERS IN A COMPUTER NETWORK

BACKGROUND OF THE INVENTION

Technical Field

The present invention relates generally to the identification of components in a computer network and more particularly, to a system for generating universally unique identifiers (UUIDs) for software objects and other components in a network in which a large number of components may exist simultaneously and/or over a period of time.

STATEMENT OF THE PROBLEM

Structured computer information depends heavily upon unique identification of data objects. Generation of unique identifiers for these data objects, as well as other computer network components, is a challenging problem. Because of the wide deployment and redeployment of computer systems and data, it is necessary for these identifiers to be unique over time and space. Such an identifier is generally termed a Universally Unique Identifier, or 'UUID'. In addition to the uniqueness requirement, which can be achieved by assigning identifiers through a central authority, it is also desirable to be able to generate new UUIDs rapidly via software, while still preserving the uniqueness of each object.

Solutions to this problem exist that create UUIDs based upon the IEEE 24-bit 'company ID values' that can be obtained from the IEEE Registration Authority. In addition, UUIDs may be created by using the various NAA (Network Address Authority) formats described in the *Fibre Channel Physical and Signaling Interface—3 (FC-PH-3) Rev 9.4*, Nov. 5, 1997.

There are usually three components to a UUID. The first component is the IEEE company ID assigned by the IEEE Registration Authority. This component is complex and slow to assign, as the registration process takes place via mail. The second component is the NAA format, consisting of additional bit combinations assigned to particular products under the control of the company owning the IEEE company ID. The third component is typically assigned by software managed by a particular product, such as a disk storage array controller. This third component consists of the bit combinations remaining in the UUID which are assigned (usually sequentially) to produce the complete UUIDs as needed.

There are two subclasses of these solutions. The first subclass is created with the assumption that there is a statistical improbability of generating duplicate UUIDs using timestamps and certain hashing techniques. The second subclass of solution utilizes persistent storage of previously generated UUIDs to prevent re-generation of duplicate UUIDs. The first solution is generally deemed to be unacceptable due to the unbounded behavior of duplicate UUIDs, which are inevitably created using that technique. Implementation of the second solution is challenging due to the expense of high speed persistent storage (e.g., reliable battery backed up RAM) and the low speed of inexpensive persistent storage (e.g., flash memory).

SOLUTION TO THE PROBLEM

The present invention overcomes the aforementioned problems of the prior art and achieves an advance in the field by providing a method which combines the high speed of volatile RAM (without a requirement for battery backup) and the low cost of non-volatile memory such as flash memory (without the requirement for high speed) to generate identifiers that are consistently unique.

In accordance with the method of the present invention, the third component of the UUID (discussed above) generated by a particular product is further divided into two sub-fields. One (sub-) field is stored in (relatively slow) non-volatile memory, and incremented infrequently. The other (sub-) field is stored in relatively fast, volatile RAM, that can be incremented quickly. During normal operation, the product creating the UUIDs generates new UUIDs by incrementing the field stored in RAM. When overflow of the RAM field occurs, the field stored in non-volatile memory is incremented. The size of the field stored in RAM is selected to cause the more expensive incrementing of non-volatile memory to occur sufficiently infrequently to minimize the impact of slow access, while maintaining a reasonable lifetime. If the product generating the UUIDs should lose the contents of RAM (due to reboot, power failure, or malfunction) it merely increments the field in non-volatile memory and resets the RAM field to zero.

When using flash memory, which has a limited number of erase/write cycles, the present invention takes advantage of the fact that multiple writes can be performed between erase cycles, as long as they only change bits from ones (1) to zeros (0), and not vice-versa. The present invention operates by initializing a block of flash memory to all ones, and then sequentially clearing (zeroing) the bits to generate each subsequent unique identifier. This method provides the equivalent of a counter that can count up to the number of available bits in the non-volatile memory block while reducing the number of flash memory erase cycles to one cycle for each time all the bits are cleared. Reducing the number of flash erase cycles is of critical importance, since flash memory is limited in the number of erase operations that can be performed over the lifetime of the memory.

DETAILED DESCRIPTION

Figure 1:
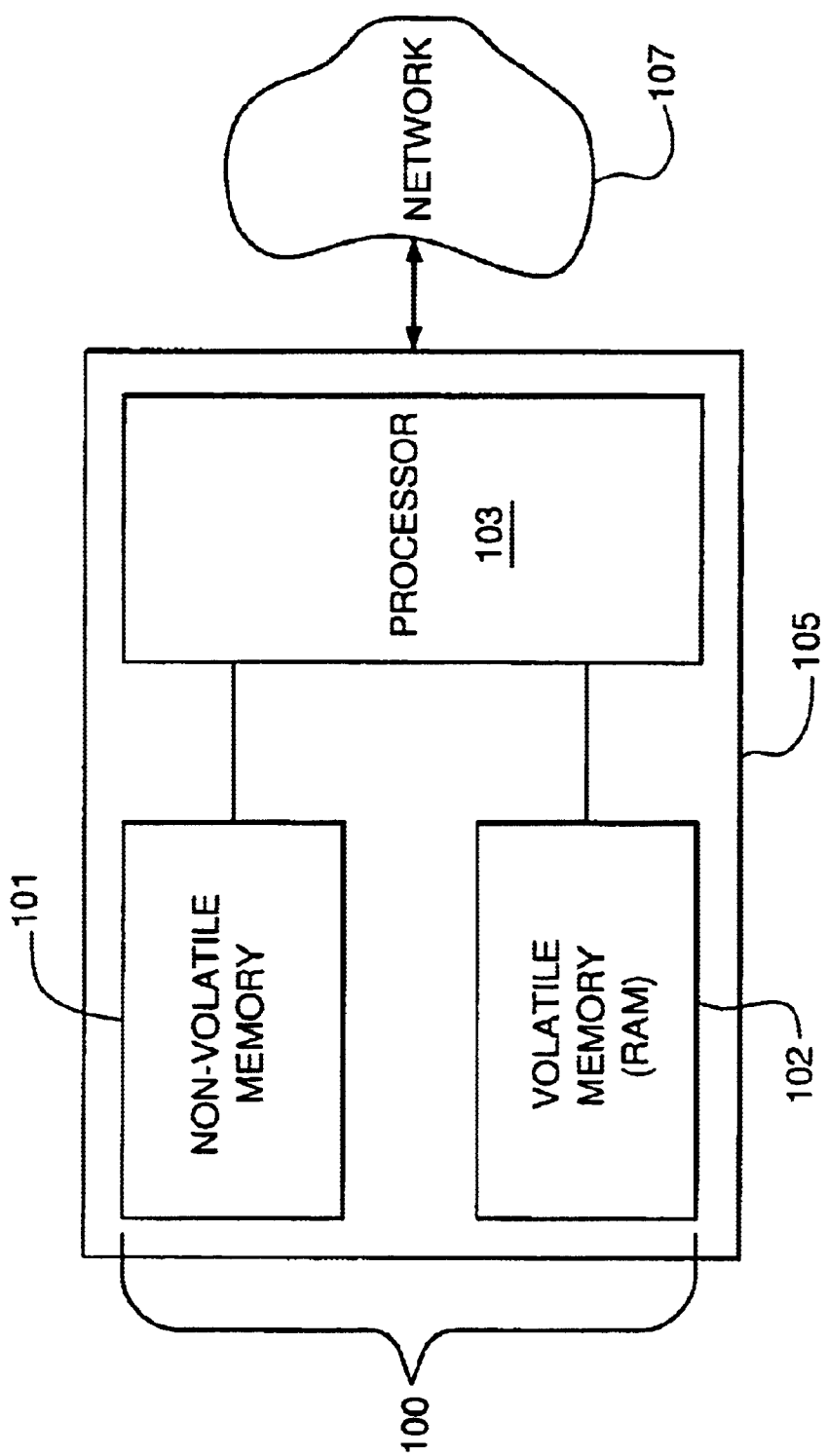
FIG. 1 is a block diagram showing the context of the volatile and non-volatile memory components of the present system in an operational context.

FIG. 1 is a block diagram showing the context of the volatile and non-volatile memory components of the present system 100 in an operational context. As shown in FIG. 1, non-volatile memory element 101 and volatile memory element 102 are coupled to a processor 103 which utilizes the two memory elements to generate identifiers which are unique across time and space. These identifiers are hereinafter referred to as Universally Unique Identifiers, or 'UUIDs'. In a large network it is typically necessary to unambiguously differentiate between large numbers of objects, thus necessitating a very large number space. The present system provides a mechanism for generating an extremely large range of numbers (on the order of $2^{48}$, in one embodiment of the invention) while requiring the associated non-volatile memory to undergo a relatively small number of erase cycles.

System elements 100–103 are shown as being included in a 'product' 105, which (among other things) generates UUIDs for various components, such as software objects, in a network 107. Product 105 is typically a storage controller, such as a Compaq HSV1xx class storage controller, but which, alternatively, may be any other device used for generating UUIDs in a network.

Although memory element 101 may be any type of non-volatile memory, in an exemplary embodiment of the present system, non-volatile memory element 101 comprises 'flash memory'. Flash memory has an inherent characteristic that large blocks (e.g., 128 KB) thereof must be erased at one time, i.e., a single bit within a given memory block cannot be set from a zero to a one without setting all of the bits in the block to ones. When a flash memory block is erased, all bits in the block are set to 'ones' (1). Subsequently, the ones can be individually changed to zeroes as required. Another characteristic of flash memory is that the total number of erase cycles is limited for any given block. Flash memory, however, is advantageously inexpensive as compared to other types of non-volatile memory. Memory element 102 is typically volatile RAM (Random Access Memory), which has the advantage of being relatively fast in comparison to flash memory.

Data Formatting

Figure 2A:
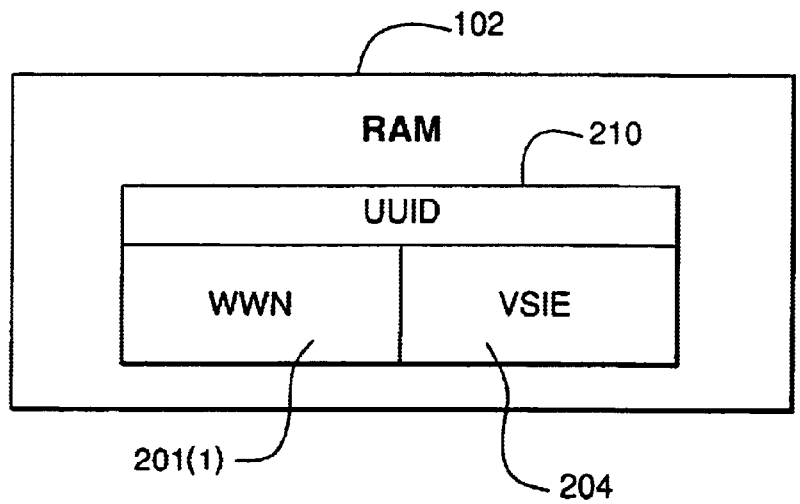
FIG. 2A is a diagram showing certain types of information stored in volatile memory in one embodiment of the method of the present invention.

FIG. 2A is a diagram showing certain types of information stored in volatile memory 102 in one embodiment of the present system 100. As shown in FIG. 2A, volatile memory (RAM) 102 contains the IEEE Registered Identifier field 201(1) and Vendor Specific Identifier Extension (VSIE) 204. WWN field 201 is an IEEE Registered Identifier. When NAA (sub)field 305 (shown in FIG. 3A) of field 201(2) is 0101b, the 64-bit quantity is an IEEE Registered Identifier. When the NAA field 305 is 0110b, the 64-bit quantity is the high-order 64-bits of a 128-bit IEEE Registered Extended Identifier, and the high-order 64-bits are not really a WWN, but derived from the WWN 201(1). For the purpose of the present description, however, Field 201 (indicated by reference numbers '201(1)' in RAM, '201(2)' in non-volatile memory, and generically as '201') is hereinafter termed simply "WWN". VSIE 204 is a 64 bit quantity that is used to generate UUIDs in accordance with the method of the present system, and is explained below in detail with reference to FIG. 3B.

Figure 3A:
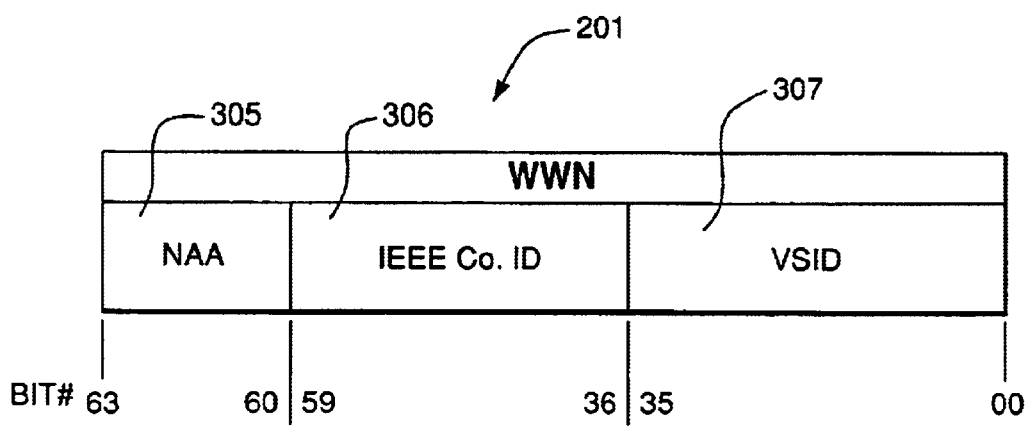
FIG. 3A is a diagram showing the 64-bits of a IEEE Registered Identifier, or the high-order 64-bits of a IEEE Registered Extended Identifier, depending upon the NAA value.

As shown in FIG. 3A, WWN 201 includes NAA (Network Address Authority, an organization such as CCITT or IEEE which administers network addresses) field 305, IEEE-assigned company ID field 306, and Vendor Specific Identifier (VSID) 307. VSID 307 contains fields describing the product type, node ID (or serial number), and port number of the product (e.g., Storage Controller) 105 issuing the UUIDs. WWN 201(1) and VSIE 204 are concatenated to form an IEEE Registered Extended Identifier, as indicated by the NAA field being changed from 0101b to 0110b, to form a UUID 210.

Figure 2B:
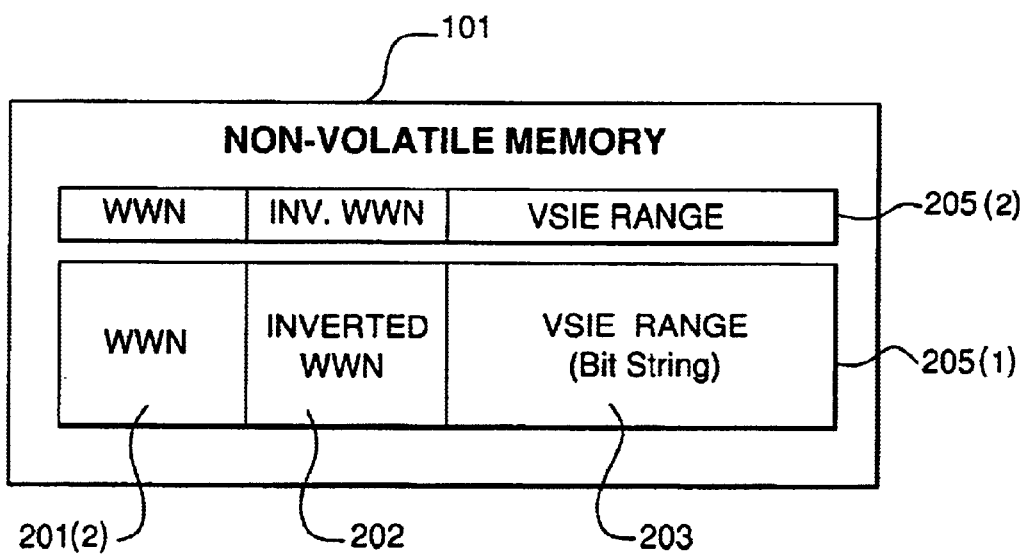
FIG. 2B is a diagram showing certain types of information stored in non-volatile memory in one embodiment of the method of the present invention.

FIG. 2B is a diagram showing certain types of information stored in non-volatile memory 101 in one embodiment of the method of the present invention. As shown in FIG. 2B, non-volatile memory 101 comprises at least one memory block 205(1) containing IEEE Registered Identifier 201(2), an 'inverted' IEEE Registered Identifier 202, and VSIE range 203. The VSIE range 203 is a string of zero bits followed by a string of one bits that is translated into a binary value (by counting the zero bits) that is stored as a component (VSIE Range 308) of the Vendor Specific Identifier Extension (VSIE) 204, described in detail below with reference to FIG. 3B. Inverted WWN 202 is the ones complement of IEEE Registered Identifier 201, and is provided for the purpose of redundancy. The inverted IEEE Registered Identifier field 202 is optional, but is desirable as an error detection mechanism.

In an exemplary embodiment of the present system 100, a second block of non-volatile memory 205(2) is used in conjunction with block 205(1) to provide redundancy, and therefore, greater reliability for the system 100. In an exemplary embodiment, memory blocks 205(1) and 205(2) each comprise a 128 KB block of flash memory, and contain identical information.

Figure 3B:
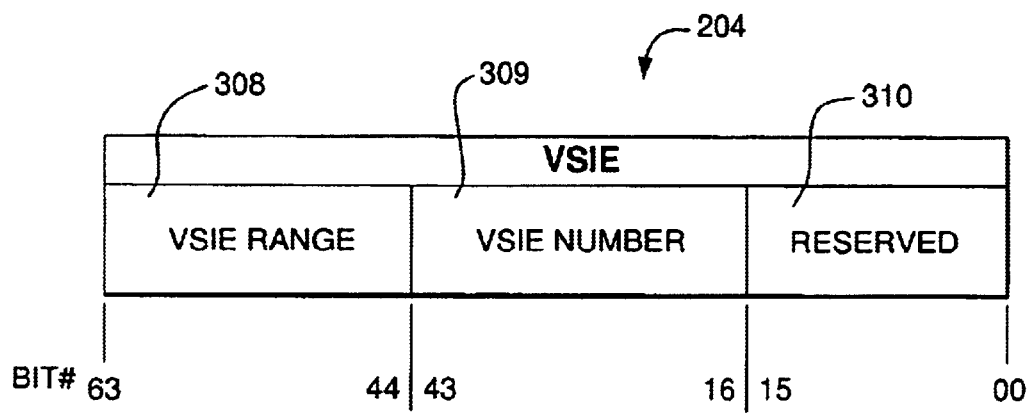
FIG. 3B is a diagram showing informational components comprising a Vendor Specific Identifier Extension in one embodiment of the present invention.

FIG. 3B shows the fields comprising a Vendor Specific Identifier Extension (VSIE) in one embodiment of the present invention. It is desirable, but not required, to reserve the low order 16 bits within the VSIE for use by the storage controller software. Field 301, shown in VSIE 204 in FIG. 3B is thus reserved for this purpose. As discussed above, non-volatile flash memory 101 is employed in order to ensure that each storage controller 105 issuing UUIDs generates a monotonic sequence of numbers in the event the current UUID value is lost in RAM 102 due to reboot, power failure or the like.

Since flash memory has a finite number of erase (to all ones then write to zeroes) cycles, it is not practical to keep track of the entire sequence of $2^{48}$ VSIEs that can be generated by a single storage controller 105. Therefore, in an exemplary embodiment of the present system, 48 bits are used to keep track of the total extent of numbers that can be generated by a given storage controller 105. This total extent is broken down into two sub-fields, shown in FIG. 3B as VSIE Range 308, which is 20 bits in length, and VSIE Number 309, which has a length of 28 bits. VSIE Range 308 is stored in flash memory 101 (in a bit pattern format, as opposed to a pure binary number format), and the VSIE Number 309 is stored in RAM. VSIE Range 308 is used to keep track of the range currently in use, and VSIE Number 309 is used as a counter to track the particular value within a given range (in VSIE Range 308). Each block of flash memory 205 contains 128 KB×8 (or $2^{20}$) bits, which provides 1024K (slightly more than one million) ranges.

The VSIE range 203 is a bit pattern in flash memory 101 is represented as a string of zeroes (initially null) followed by a string of ones, since bits in the pattern are set from one to zero sequentially from left to right in the present embodiment. Alternatively, the bits in VSIE range 203 could be set sequentially from right to left, in which case the pattern would be a string of ones followed by a string (initially null) of zeroes. In either event, a corresponding binary value stored as VSIE Range 308 in the Vendor Specific Identifier Extension (VSIE) 204 is 'correlated' by processor 103 with the VSIE range bit string 203 in flash memory 101, by incrementing VSIE Range field 308 for each subsequent bit that is set in VSIE range 203.

It should be noted that the number of bits used to represent the particular VSIE Range 308 in use can be adjusted to accommodate different sizes of flash memory, or to compensate for the number of blocks of memory used in a given application. In a system using a block size other than 128 KB, the number of bits used for the value within a VSIE range 308 would be adjusted to count the number of bits in the VSIE range bit string 203. The number of bits used for the VSIE number 309 would be adjusted so that the total number of bits used for the VSIE range 308 and VSIE number 309 is 48 bits in accordance with the presently described embodiment.

System Initialization and Operation

Prior to the initial generation of UUIDs, flash memory blocks 205 in storage controller 105 are erased to all ones. Next, the IEEE Registered Identifier 201(2) of the particular storage controller 105 is written into the first 8 bytes of each block 205 in accordance with FIG. 3A. The ones complement of IEEE Registered Identifier 201(2) is then written as inverted IEEE Registered Identifier 202 into the second 8 bytes of each block. The remaining bits in each flash memory block 205 are left set to ones. These remaining bits constitute the VSIE range 203.

In operation, as each range represented by VSIE Number 309 is consumed by using all $2^{28}$ values in the range (or by reinitializing storage controller 105), the next bit in VSIE range 203 in each block 205 is cleared to zero, thus indicating that numbers from that range are being consumed. Subsequent overflows of VSIE Number field 309, or re-initializations of storage controller 105, will cause the next bit in VSIE range bit string 203 to be cleared to zero. The first clear bit in VSIE range 203 indicates that VSIEs in the range from $2^{16}$ to $(2^{44}-2^{16})$ are being used. This is due to the fact that the VSIE range actually starts at $2^{16}$, since the UUID for storage controller 105 has a VSIE value of 0, due to the fact that the low order 16 bits (field 310 in FIG. 3B) of VSIE Range 308 (stored in RAM 102) must be reserved. When the second bit of VSIE range 203 is cleared, it indicates that VSIEs in the range from $2^{44}$ to $(2^{45}-2^{16})$ are being issued, and so forth.

Table 1, below, shows the procession of ranges in the present embodiment:

TABLE 1

| VSIE Range number/bit | Lowest VSIE value | Highest VSIE value |
|---|---|---|
| 0 | $0 * 2^{44} + 2^{16}$ | $(1 * 2^{44}) - 2^{16}$ |
| 1 | $1 * 2^{44}$ | $(2 \times 2^{44}) - 2^{16}$ |
| 2 | $2 * 2^{44}$ | $(3 \times 2^{44}) - 2^{16}$ |
| 3 | $3 * 2^{44}$ | $(4 \times 2^{44}) - 2^{16}$ |
| . | | |
| . | | |
| . | | |
| n | $n * 2^{44}$ | $((n+1) \times 2^{44}) - 2^{16}$ |
| . | | |
| . | | |
| . | | |
| $2^{20} - 1$ | $(2^{20} - 1) * 2^{44}$ | $(2^{20} \times 2^{44}) - 2^{16}$ |

Processor 103 makes the appropriate correlation of VSIE range bit string 203 with the binary value stored in VSIE Range 308 in VSIE 204, by simply incrementing VSIE Range 308 each time an overflow of VSIE Number field 309 occurs. If VSIE Range 308 is lost, it can be recomputed by counting the number of zero bits in VSIE range bit string 203.

Since the combined length of VSIE Number 309 (28 bits) and VSIE Range 308 (20 bits) is 48 bits, a total of $2^{48}-1$ (slightly more than $2.8 \times 10^{14}$) UUIDs can be generated by the embodiment shown in FIG. 3B.

As shown in FIG. 2B, the only valid configuration of the bits in a flash memory block 205 consists of the following entities in the order listed below:

(1) the appropriate IEEE Registered Identifier 201(2)

(2) the ones complement of the WWN 202

(3) a contiguous sequence of zero bits (initially null)

(4) a contiguous sequence of 'one' bits to the end of the block 205

Items (3) and (4) above constitute VSIE range 203. Any bit pattern other than the one above in a memory block 205 indicates a failure in flash memory 101. The characteristics of flash memory make it unlikely that a zero will randomly become a one, even by a programming error. A 'one' bit that erroneously becomes a zero will be detected as an error unless it was the next bit to be cleared in memory 205, in which case, only a single range will be lost and no duplicates will be generated.

In an alternative embodiment of the present invention, upon restart processor 103 may set the VSIE Number 309 to all ones such that the next UUID allocated will clear the next bit in the VSIE Range Bit String 203. This technique avoids consuming ranges unnecessarily when storage controller 105 is repeatedly re-initialized due to power failures or other causes.

Data Format for Small Non-Volatile Memory Capacity Systems

In a system 100 having erasable non-volatile (e.g., flash) memory units with smaller than 128 KB blocks, the UUID generation mechanism of the embodiment described above may be extended to make more efficient use of the non-volatile memory 101. An alternative embodiment of the present system 100 employs a counter in each duplicate block of flash memory 205.

Figure 4:
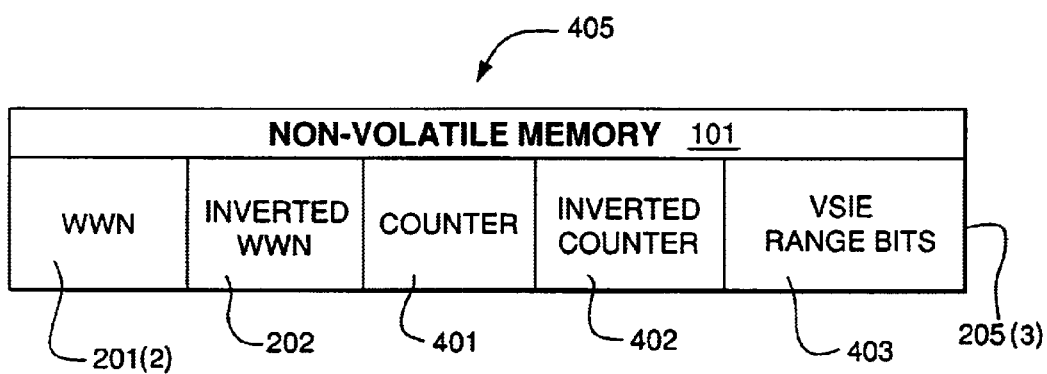
FIG. 4 is a diagram showing certain types of information stored in non-volatile memory in an alternative embodiment of the present invention.

FIG. 4 is a diagram showing information stored in non-volatile memory in an alternative embodiment of the present invention. As shown in FIG. 4, memory block 205(3) in non-volatile memory 101 includes a counter 401, as well as an inverted counter 402 (for the purpose of providing redundancy), in addition to the IEEE Registered Identifier 201(2) and Inverted IEEE Registered Identifier 202 found in the embodiment of FIG. 2B. The embodiment of FIG. 4 includes a VSIE Range field 403 which is reduced in size relative to VSIE range 203 field of the embodiment of FIG. 2B. Only a single non-volatile memory block 205(3) is shown in FIG. 4, but a second, redundant block of non-volatile memory (not shown) may be desirable as a backup mechanism.

In the presently described embodiment, counter 401 is a 32 bit counter which allows the number of ranges represented by VSIE Number 309 to be extended beyond the number of bits available in a single memory block 205. Counter 401 can be incremented up to the number of erase cycles allowed for a given block 205. Therefore, the range of a single memory block 205 can be extended to the number of bits (minus overhead) times the number of erase cycles.

For example, assume that the non-volatile memory block 205(3) of FIG. 4 has a capacity of 16 KB and can be erased and re-written at least 100,000 times. Using these values yields a total of 16K*8*100K, which equals approximately $13 \times 10^{12}$ ranges, which is about 13,000 times more ranges than the mechanism described above with respect to FIG. 2B, despite the smaller memory block size.

Figure 5:
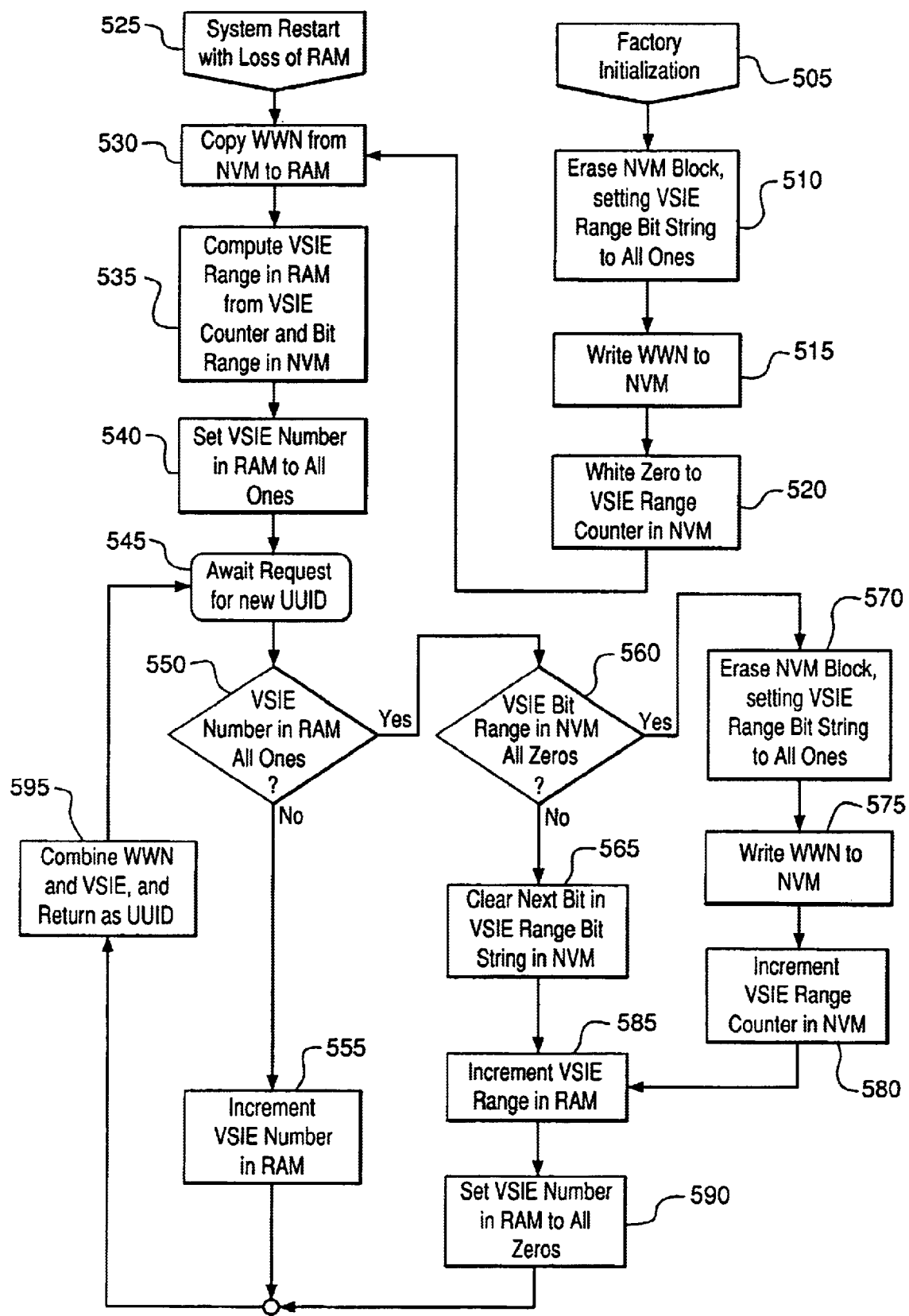
FIG. 5 is a flowchart illustrating steps performed in practicing one embodiment of the present invention, wherein a counter in non-volatile memory is used to extend the range of UUIDs generated.

FIG. 5 is a flowchart illustrating steps performed in practicing the embodiment of the present invention depicted in FIG. 4. The operation of system 100 in this embodiment is best understood by viewing FIGS. 4 and 5 in conjunction with one another. As shown in FIG. 5, processing commences at step 505 when the system is manufactured. At step 510, the non-volatile memory 205(3) is erased, setting the VSIE range bit string 403 in non-volatile memory 101 to all ones. The IEEE Registered Identifier 201 is stored in non-volatile memory 101 as field 201(2), at step 515, and at step 520, counter 401 in non-volatile memory is set to zero. Although not necessary for operation of system 100, it is desirable, for the purpose of providing redundancy, to employ an inverted WWN and inverted counter, in which case inverted WWN field 202 and inverted counter 402 are set to the ones complement of fields 201(2) and 401, respectively. System initialization continues at step 530.

When the contents of RAM are lost, processing commences at step 525. At step 530, the IEEE Registered Identifier 201 is copied from field 201(2) of non-volatile memory into RAM 102 as field 201(1). Then at step 535 the VSIE Range (sub)field 308 is computed by multiplying the contents of counter 401 by one plus the total number of bits in the VSIE Range Bits field 403 and adding the count of zero bits in the VSIE Range bits field 403. Finally, the VSIE Number (sub)field 309 in RAM 102 is set to all ones, at step 540. At step 545, normal system operation begins with processing waiting for a UUID to be requested.

When a UUID is requested, a check is made at step 550 to determine if the VSIE Number (sub)field 309 in RAM 102 has reached its maximum value of all ones. If not, VSIE Number (sub)field 309 is incremented, at step 555, and UUID generation continues at step 595, where VSIE Range field 308 and Number field 309 in RAM 102, together with reserved field 301, are concatenated with the IEEE Registered Identifier 201 with NAA field 305 changed to 0110b to generate the next sequential UUID. UUID generation continues at step 545.

If, at step 550, it is determined that the VSIE Number (sub)field 309 is all ones, a check is then made at step 560 to determine if all bits in VSIE range bit string 403 in non-volatile memory are zero. If not, the next bit in VSIE range bit string 403 is cleared (at step 565) and UUID generation continues at step 585. If all bits in VSIE range bit string 403 are zero, non-volatile memory block 205(3) is erased at step 570, setting the VSIE range bit string 403 in non-volatile memory 101 to all ones. The the IEEE Registered Identifier 201 is then stored in non-volatile memory 101 as field 201(2), at step 575, and counter 401 is incremented and stored in non-volatile memory 101 as field 401, at step 580.

At step 585, the VSIE Range (sub)field 308 in RAM 102 is incremented, and at step 590, VSIE number field 309 in RAM is reset to all zeroes. At step 595, VSIE Range field 308 and Number field 309 in RAM 102, together with reserved field 301, are concatenated with the IEEE Registered Identifier 201 with NAA field 305 changed to 0110b to generate the next sequential UUID. UUID generation continues at step 545, waiting for the next UUID to be requested.

While preferred embodiments of the present invention have been shown in the drawings and described above, it will be apparent to one skilled in the art that various embodiments of the present invention are possible. For example, the specific size of the non-volatile memory blocks and the VSIE Range fields in non-volatile memory, the size of the VSIE Range field and the VSIE Number field size in RAM, as well as the inclusion of a World Wide Name in the UUIDS generated as described above should not be construed as limited to the specific embodiments described herein. Modification may be made to these and other specific elements of the invention without departing from its spirit and scope as expressed in the following claims.

I claim:

1. A method for creating a series of unique identifiers using a processor coupled to volatile memory and to at least one block of non-volatile memory, the method comprising the steps of:

storing a predetermined identifier in said non-volatile memory and in said volatile memory;

setting a bit string in said non-volatile memory to a value of all ones;

setting a number subfield and a range subfield, together comprising an extension field in said volatile memory, to zero; and generating a monotonic sequence of said unique identifiers by repetitively performing the steps of:
  incrementing said number subfield;
  creating said unique identifier by concatenating said predetermined identifier and said extension field; and
  when said number subfield contains all ones, performing the steps of:
    setting to zero, a next sequential bit in the bit string in said non-volatile memory;
    incrementing said range subfield in said volatile memory; and
    resetting said number subfield to zero.

2. The method of claim 1, wherein, in the event that the contents of said volatile memory are lost, establishing a new value for said unique identifier by performing the steps of:

storing, in said range subfield in said extension field, the binary equivalent of the number of sequential zero bits in the bit string in said non-volatile memory; and setting said number subfield to all ones.

3. The method of claim 1, wherein said predetermined identifier is derived from a World Wide Name.

4. A method for creating a series of unique identifiers using a processor coupled to volatile memory and to at least one block of non-volatile memory, the method comprising the steps of:

storing a predetermined identifier in said non-volatile memory and in said volatile memory;

setting a bit string in said non-volatile memory to a value of all ones;

setting a counter in said non-volatile memory to a value of zero;

setting a number subfield and a range subfield, together comprising an extension field in said volatile memory, to zero; and generating a monotonic sequence of said unique identifiers by repetitively performing the steps of:
  incrementing said number subfield;
  creating said unique identifier by concatenating said predetermined identifier and said extension field; and
  when said number subfield contains all ones, performing the steps of:
    incrementing said range subfield in said volatile memory; and
    resetting said number subfield to zero;
    setting to zero, a next sequential bit in the bit string in said non-volatile memory; and
    when said bit string in said non-volatile memory contains all zeroes, performing the steps of:
      incrementing counter in said non-volatile memory; and
      resetting said bit string in to all ones.

5. The method of claim 4, wherein, in the event that the contents of said volatile memory are lost, establishing a value for said unique identifier by performing the steps of:

storing, in said range subfield in said extension field, a value equal to the binary value of the counter times one plus the total number of bits in the bit string in said non-volatile memory, plus the binary equivalent of the number of zero bits in the bit string in said non-volatile memory; and setting said number subfield to all ones.

6. The method of claim 4, wherein said predetermined identifier is derived from a World Wide Name.

7. A system for generating a series of unique identifiers for use in a computer network, the system comprising:

volatile memory containing one of the unique identifiers comprising a predetermined identifier and a field including a number subfield and a range subfield;

non-volatile memory containing a copy of said predetermined identifier and bit string representing a value of said range subfield; and a processor coupled to said volatile memory and said non-volatile memory;

wherein said system generates a monotonic sequence of said unique identifiers by incrementing said number subfield.

8. The system of claim 7, wherein, when said number subfield contains all ones, a bit in the bit string in said non-volatile memory is set to zero; said range subfield is incremented; and said number subfield is reset to zero.

9. The system of claim 7, wherein, in the event that the contents of said volatile memory are lost, reestablishing a value for said one of the unique identifiers by:

storing, in said range subfield, a value equal to the binary equivalent of the number of zero bits in the bit string in said non-volatile memory and setting said number subfield to all ones.

10. The system of claim 7, wherein said predetermined identifier is derived from a World Wide Name.

11. A system for generating a series of unique identifiers for use in a computer network, the system comprising:

volatile memory containing one of the unique identifiers comprising a predetermined identifier and a field including a number subfield and a range subfield;

non-volatile memory containing a copy of said predetermined identifier and bit string representing a value of said range subfield; and a processor coupled to said volatile memory and said non-volatile memory;

wherein said system generates a monotonic sequence of said unique identifiers by incrementing said number subfield;

wherein, when said number subfield contains all ones, a bit in the bit string in said non-volatile memory is set to zero; said range subfield is incremented; and said number subfield is reset to zero; and wherein, a value for said one of the unique identifiers is determined by storing, in said range subfield, the binary equivalent of the number of zero bits in the bit string in said non-volatile memory.

12. The system of claim 11, wherein said predetermined identifier is derived from a World Wide Name.

13. A system for generating a series of unique identifiers for use in a computer network, the system comprising:

volatile memory containing one of the unique identifiers comprising a predetermined identifier and a field including a number subfield and a range subfield;

non-volatile memory containing a counter, a copy of said predetermined identifier and bit string representing a value of said range subfield; and a processor coupled to said volatile memory and said non-volatile memory;

wherein said system generates a monotonic sequence of said unique identifiers by incrementing said number subfield;

wherein, when said number subfield contains all ones, a bit in the bit string in said non-volatile memory is set to zero; said range subfield is incremented; and said number subfield is reset to zero; and wherein, when said bit string in said non-volatile memory contains all zeroes, the counter in said non-volatile memory is incremented and the bit string in said non-volatile memory is set to all ones.

14. The system of claim 13, wherein a value for said one of the unique identifiers is determined by storing, in said range subfield, a value equal to the binary value of the counter times one plus the total number of bits in the bit string in said non-volatile memory, plus the binary equivalent of the number of zero bits in the bit string in said non-volatile memory.

15. The system of claim 13, wherein said predetermined identifier is derived from a World Wide Name.

\* \* \* \* \*